United States Patent [19]
Zanzig et al.

[11] Patent Number: 5,798,408
[45] Date of Patent: Aug. 25, 1998

[54] TIRE TREAD OF COUPLED SIBR

[75] Inventors: David John Zanzig, Uniontown; Wen-Liang Hsu, Cuyahoga Falls; Adel Farhan Halasa, Bath; Barry Allen Matrana, Akron, all of Ohio

[73] Assignee: The Goodyear Tire & Rubber Company, Akron, Ohio

[21] Appl. No.: 811,629

[22] Filed: Mar. 5, 1997

[51] Int. Cl.$^6$ .................................................. C08L 53/00

[52] U.S. Cl. .................. 524/505; 524/526; 525/209; 525/237; 152/450; 156/910

[58] Field of Search .................. 525/237, 209; 524/505, 526; 152/450; 156/910

[56] References Cited

U.S. PATENT DOCUMENTS

| | | | |
|---|---|---|---|
| 4,513,115 | 4/1985 | Beers | 528/17 |
| 5,047,483 | 9/1991 | Halasa et al. | 525/537 |
| 5,422,403 | 6/1995 | Hsu et al. | 525/342 |
| 5,504,140 | 4/1996 | Zanzig et al. | 524/526 |
| 5,514,757 | 5/1996 | Hsu et al. | 525/332.5 |

*Primary Examiner*—Melvyn I. Marquis
*Attorney, Agent, or Firm*—Henry C. Young, Jr.

[57] ABSTRACT

This invention relates to a tire having a tread composed of quantitatively silica reinforced rubber composition, with a minor amount, if any, of carbon black where the tread elastomers are primarily composed of coupled styrene/isoprene/butadiene terpolymer with tin or silicon in combination with selected diene-based elastomers.

10 Claims, No Drawings

5,798,408

1

TIRE TREAD OF COUPLED SIBR

FIELD

This invention relates, in general, to tires having treads composed of silica-reinforced rubber composition containing a minor amount, if any, of carbon black.

BACKGROUND OF THE INVENTION

Tire treads are conventionally composed of elastomer(s) reinforced with carbon black and sometimes with silica.

While various elastomers may be used for tire tread compositions, sometimes tin, or silicon, coupled elastomers, including a styrene/isoprene/butadiene terpolymer rubber, have been suggested.

For example, U.S. Pat. No. 5,422,403 relates to use of tin, or silicon, coupled elastomers in tire treads which may be reinforced with carbon black and/or silica.

U.S. Pat. No. 5,514,757 relates to an isoprene terminated styrene-isoprene-butadiene terpolymer rubber (SIBR) containing about 1 to about 10 percent isoprene and having a Tg in a range of about −18° C. to about −48° C. which is coupled with tin or silicon which can be blended with at least one of natural rubber and cis 1,4-polybutadiene rubber.

U.S. Pat. No. 5,047,483 relates to a pneumatic tire having a tread composed of an SIBR, cis 1,4-polyisoprene rubber and cis 1,4-polybutadiene rubber.

U.S. Pat. No. 5,272,220 relates to the preparation of an SIBR contemplated for use in making truck tire treads.

U.S. Pat. Nos. 5,272,220 and 5,317,062 relate to a truck tire tread composed of SIBR and natural rubber.

It is observed that various coupled styrene/butadiene copolymer elastomers are sometimes used in tire tread rubber compounds because they have sometimes been found to promote improved unvulcanized rubber composition processability, lower vulcanized rubber composition hysteresis and improved filler-rubber interactions as compared to their uncoupled counterparts.

It is well known that the efficiency of coupling agents decreases substantially if the polymer live ends are styryl lithium anions. Therefore, it is desired that the coupling agents, such as for example tin or silicon, are coupled to dieneyl moieties of the elastomer.

However, it is to be appreciated that styryl lithium anions, as opposed to the more desirable dienyl moieties, are normally at the living chain ends of styrene/butadiene elastomers which are synthesized by anionic polymerizations of the monomers in the presence of polar modifiers. To overcome this problem, it is known that addition of a very small amount of additional 1,3-butadiene monomer, in amounts of parts per million of monomer, can be added to the polymerization system to cap the living styryl anion prior to tin or silicon coupling. However, the adding of additional 1,3-butadiene monomer to the polymerization system after the aforesaid initial polymerization has been completed but prior to coupling has certain disadvantages. For instance, introduction of additional 1,3-butadiene monomer into the polymerization medium can increase the level of impurities present in the system. Introduction of additional 1,3-butadiene monomer also represents an additional processing step which, of course, on a commercial basis adds to the ultimate cost of the polymer.

However, as presented in U.S. Pat. No. 5,514,757, introduction of isoprene as a monomer together with the 1,3-butadiene and styrene, usually also with a modifier, has been observed to substantially solve this problem and allow a preponderance of tin-dienyl, or silicon-dienyl as the case may be, bonds in the resulting styrene/isoprene/butadiene terpolymer elastomer.

SUMMARY OF THE INVENTION

In accordance with this invention, a tire is provided having a tread of a rubber composition which comprises, based upon 100 phr of elastomers, (1) elastomers comprised of (A) about 40 to about 75, alternatively about 50 to about 65, phr of a tin or silicon coupled, isoprene terminated, styrene/isoprene/butadiene terpolymer elastomer comprised of about 1 to about 20 weight percent units derived from styrene, about 12 to about 40, preferably about 15 to about 40, weight percent units derived from isoprene and about 40 to about 87 weight percent units derived from 1,3-butadiene in a relatively random distribution except for terminal isoprene units and having a Tg within a range of about −60° C. to about −85° C., preferably about −65° C. to about −85° C., (B) about 20 to about 50, alternatively about 25 to about 40, phr of isoprene/butadiene copolymer elastomer having an isoprene content in a range of about 10 to about 30 percent and a Tg in a range of about −65° C. to about −90° C., and (C) about 5 to about 25, alternatively about 10 to about 20, phr of at least one other elastomer selected from isoprene/butadiene copolymer elastomer having an isoprene content in a range of about 50 to about 90 percent and a Tg in a range of about −50° C. to about −15° C., trans 1,4-polybutadiene polymer having a trans 1,4-content in a range of about 70 to about 90 percent and a Tg in a range of about −65° C. to about −80° C., a styrene/isoprene/butadiene terpolymer rubber which is not appreciably isoprene terminated and preferably having a Tg in a range of about −45° C. to about −20° C., cis 1,4-polyisoprene rubber, cis 1,4-polybutadiene rubber, high vinyl polybutadiene rubber having a vinyl 1,2-content in a range of about 35 to about 80 percent, styrene/isoprene copolymer rubber, styrene/butadiene copolymer rubber containing about 23 to about 53, alternatively a high styrene content of about 30 to about 50, percent styrene units, and 3,4-polyisoprene rubber, (2) about 45 to about 150, alternatively about 45 to about 90, phr of reinforcing filler selected from precipitated silica and carbon black comprised of (a) about 30 to about 90, alternatively about 30 to about 65, phr of silica and (b) about 2 to about 25, alternatively about 2 to about 60, phr of carbon black and (3) a silica coupler for said silica having a moiety reactive with the surface of the silica (eg silanol groups on the surface of the silica) and another moiety interactive with said elastomers.

This invention is based upon the finding that tin or silicon coupled styrene/isoprene/butadiene terpolymer elastomers (SIBR's) which are terminated with isoprene repeat units can be advantageously used in a quantitatively silica reinforced rubber composition for a tire tread which is required to also contain the aforesaid isoprene/butadiene rubber having the Tg within a range of about −65° C. to about −90° C.

It is recognized that U.S. Pat. No. 5,514,757 discloses tire treads of rubber compositions composed of isoprene terminated SIBR having about 1 to about 10 percent units derived from isoprene, and another diene-based elastomer selected from natural rubber and cis 1,4-polybutadiene rubber. However such patent does not teach or suggest a required inclusion of the aforesaid low Tg isoprene/butadiene copolymer elastomer for the rubber composition and high silica reinforcement.

However, it has now been considered that such isoprene terminated SIBR with higher isoprene content and lower Tg can be used in a tire tread with the required aforesaid low Tg isoprene/butadiene copolymer together with additional selected elastomers and high silica reinforcement in a manner which is not taught in the aforesaid U.S. Patent.

In one aspect of the invention, it is preferred to blend the aforesaid coupled, isoprene terminated SIBR and low Tg isoprene/butadiene copolymer rubber, optionally with the aforesaid additional elastomers, in a step-wise mixing procedure.

Thus, the rubber composition of this invention may be prepared by (a) thermomechanically working and mixing the elastomer blend of this invention, precipitated silica, carbon black if used, silica coupler and conventional rubber compounding ingredients exclusive of sulfur and vulcanization accelerators with a mechanical mixer in at least one mixing stage to a maximum temperature in range of about 155° C. to about 190° C. and for a duration of time, upon reaching said maximum temperature range, of about 1 to about 8 minutes followed by (b) mixing curatives, including sulfur and vulcanization accelerator(s), with said mixture with a mechanical mixer for about 1 to about 4 minutes to a temperature of about 90° C. to about 120° C., whereas the rubber mixture is cooled to a temperature below about 40° C. between each of the aforesaid mixing stages.

It is to be appreciated that, for each mixing stage, the initial rubber, temperature upon being introduced to the mechanical mixer is below 40° C. and its temperature then rises during the mixing operation to reach the aforesaid maximum temperature ranges. Preferably the mechanical mixers are internal rubber mixers, although open mills may be used entirely or intermittently between the internal rubber mixers for the aforesaid mixing stages.

In practice, for silica reinforced elastomer compositions, numerous coupling agents are taught for use in combining silica and rubber such as, for example, silane coupling agents containing a polysulfide component, or structure such as, for example, trialkoxyorganosilane polysulfides containing from about 2 to about 8 sulfur atoms in a polysulfide bridge such as, for example, bis-(3-triethoxysilylpropyl) tetrasulfide and/or trisulfide. Here, the silane portion of the coupler is believed to be reactive with the surface of the silica, namely with silanol groups typically contained on the surface of the silica, and the tetrasulfide portion is interactive with the diene-based elastomers contained in the elastomer composition.

In one aspect, a silica coupler is contemplated as a bis 3-(trialkoxysilylalkyl) polysulfide with a polysulfide bridge containing about 60 to about 90, alternatively about 70 to about 85, percent of the sulfur atoms are in a bridge of two sulfur atoms. Representative examples of such polysulfides which are primarily disulfides are, for example, bis 3-(triethoxysilylpropyl) polysulfide, bis 3-(trimethoxysilylpropyl) polysulfide and bis 3-(triethoxysilylmethyl) polysulfide.

It is a significant feature of this invention that the tin or silicon coupled SIBR is required to be isoprene terminated. Such a terpolymer can be synthesized, for example, by employing lithium initiators and polar modifiers without the necessity of a separate isoprene monomer addition step. Essentially all of the living chain ends in the polymer are terminated with isoprene repeat units. Because virtually all of the living chain ends in the polymer are terminated with isoprene, it can be readily coupled with tin tetrachloride or silicon tetrachloride coupling agents.

After being coupled, the styrene-isoprene-butadiene terpolymer elastomer (SIBR) has a high level of affinity for carbon black and silicon fillers. Tin tetrachloride may be a preferred coupling agent in cases where the use of silicon fillers is contemplated. This is because it is considered herein that better interaction may occur between the isoprene terminated, tin coupled SIBR and silica reinforcement, particularly where the isoprene terminated SIBR is coupled with tin tetrachloride.

The isoprene terminated SIBR for use in this invention is prepared by solution polymerizations utilizing an organo-lithium initiator. The process used in synthesizing this SIBR is conducted as a batch or continuous process which is carried out at a temperature which is within the range of about 20° C. to about 150° C. In cases where the polymerization is conducted employing a continuous process, it will be necessary to utilize a multiple reactor system to ensure that the polymerization has been carried out to a conversion where isoprene repeat units are at the end of virtually all of the polymer chains. It has been found that gel build-up can be inhibited by conducting such polymerizations in the presence of 1,2-butadiene and N,N,N',N'-tetramethylethylenediamine.

The process for preparing a coupled styrene-isoprene-butadiene rubber which is considered herein to be particularly valuable for use in making automobile tire tread rubber compounds which comprises the steps of (1) solution terpolymerizing in an organic solvent from about 1 weight percent to about 20 weight percent styrene, from about 12 weight percent to about 40 weight percent isoprene, and from about 40 weight percent to about 87 weight percent 1,3-butadiene, based on total monomers, to a conversion of at least about 90% to produce a living styrene-isoprene-butadiene polymer, wherein the terpolymerization is initiated with an organolithium compound, and wherein the terpolymerization is conducted in the presence of a polar modifier at a molar ratio of the polar modifier to the organolithium compound which is within the range of about 0.5:1 to about 5:1, and wherein the terpolymerization is conducted at a temperature which is within the range of about 20° C. to about 150° C.; and (2) coupling the living styrene-isoprene-butadiene polymer with a coupling agent selected from the group consisting of tin tetrachloride and silicon tetrachloride, wherein the molar ratio of the coupling agent to the organolithium compound is within the range of about 1:3 to 1:6.

As hereinbefore discussed, the styrene-isoprene-butadiene rubber which is considered herein to be particularly valuable for use in making tire treads, is comprised of repeat units which are derived from about 1 weight percent to about 20 weight percent styrene, from about 12 weight percent to about 40, alternatively about 15 to about 40, weight percent isoprene, and from about 40 weight percent to about 87 weight percent 1,3-butadiene, wherein the repeat units derived from styrene, isoprene, and 1,3-butadiene are in essentially random order, except for the terminal isoprene units, although it is considered that the isoprene is otherwise dispersed within the terpolymer, wherein the rubber has a glass transition temperature (Tg) which is within a range of about −60° C. to about −85° C., and wherein over 90% of the repeat units in the SIBR which are derived from styrene are in blocks of styrene containing less than three repeat units, wherein the rubber is coupled with a member selected from the group consisting of tin tetrachloride and silicon tetrachloride, and wherein the rubber has a number average molecular weight which is within the range of about 250,000 to about 400,000.

Thus, the coupled SIBR used in this invention is synthesized by organic solution polymerization. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations to prepare such isoprene terminated, coupled SIBR elastomers, there will normally be from about 5 to about 35 weight percent monomers in the polymerization medium. Such polymerization media are, of course, comprised of the organic solvent, 1,3-butadiene monomer, styrene monomer and isoprene monomer. In most cases, it will be preferred for the polymerization medium to contain from 10 to 30 weight percent monomers It is generally more preferred for the polymerization medium to contain 20 to 25 weight percent monomer.

The monomer charge compositions utilized in the preparation of the coupled SIBR will typically contain from about 1 weight percent to about 20 weight percent styrene, from about 12 weight percent to about 40 weight percent isoprene and from about 40 weight percent to about 87 weight percent 1,3-butadiene monomer.

The isoprene terminated, coupled SIBR used in this invention can be synthesized on a batch or continuous basis. In batch processes, all of the monomers are generally charged into a single reactor with the polymerization therein being started by the addition of an organolithium initiator. In such batch processes, the polymerization is allowed to continue in the reactor until a high conversion of at least about 98 percent is attained. It is preferred for the monomer conversion to be at least 99 percent and more preferred for the monomer conversion to be in excess of 99.5 percent.

In continuous processes, the monomers and an organolithium initiator are continuously fed into the first reactor of a multiple reaction vessel system. In such multiple reaction vessel systems, it is important for the monomer conversion in the last reactor to attain a high conversion of at least about 98 percent. It is preferred for the monomer conversion to be at least 99 percent and more preferred for the monomer conversion to be in excess of 99.5 percent.

In both batch and continuous polymerizations, the pressure in the reaction vessel is typically sufficient to maintain a substantially liquid phase under the conditions of the polymerization reaction. The reaction medium will generally be maintained at a temperature which is within the range of about 20° C. to about 150° C. throughout the terpolymerization. This is generally preferred for the terpolymerization to be conducted at a temperature which is within the range of about 60° C. to about 120° C. It is typically more preferred for the terpolymerization to be conducted at a temperature which is within the range of about 80° C. to about 100° C.

The organolithium compounds which can be utilized as initiators in the polymerization scheme for preparation of the isoprene terminated, coupled SIBR terpolymer for use in this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the SIBR being synthesized. An amount of organolithium initiator will be selected to result in the production of SIBR having a number average molecular weight which is within the range of about 50,000 to about 200,000. The amount of organolithium initiator will preferably be selected to result in the production of a SIBR having a number average molecular weight which is within the range of about 75,000 to 150,000. The amount of organolithium initiator will more preferably be selected to result in the production of an SIBR having a number average molecular weight which is within the range of about 85,000 to 120,000. The number average molecular weights reported in this paragraph are before coupling.

As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of 1,2-butadiene and N,N,N',N'-tetramethylethylenediamine (TMEDA). For this reason, 1,2-butadiene and TMEDA will also be continuously fed into the reaction vessel utilized. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The TMEDA acts as a polymerization modifier and gel inhibitor for the SIBR produced. It will accordingly be employed, either alone or in conjunction with other polar modifiers, in an amount which will result in the SIBR being synthesized having the desired high glass transition temperature. However, to be effective as a gel inhibitor, the TMEDA will typically be present at a molar ratio of TMEDA to the organolithium compound of at least about 0.01:0.1. It will normally be preferred for a molar ratio of TMEDA to the organolithium compound of at least about 0.1:0.15 to be employed.

The glass transition temperature of the SIBR being synthesized may be controlled to be within the range of about −60° C. to about −85° C., alternatively in a range of about −65° C. to about −85° C.

After the desired high monomer conversion of at least about 98% is achieved, the living polymer is coupled with tin tetrachloride or silicon tetrachloride. This is typically done in a second reaction vessel. For instance, in the case of a continuous polymerization, the living intermediate polymer can be pumped from the final polymerization reaction vessel to a vessel where the coupling agent is added to the polymerization medium. The coupling agent is added after a monomer conversion of at least about 98% has been attained and is more preferably added after a monomer conversion of 99% has been attained.

The coupling agent is added at a level which is sufficient to jump the molecular weight of the polymer to the desired degree. A high level of coupling of the SIBR terpolymer chains is very desirable. As a general rule, the molar ratio of coupling agent to the organolithium compound will be within the range of about 1:3 to about 1:6. Molar ratios of the coupling agent to the organolithium compound which are within the range of about 2:7 to about 1:5 are preferred because they induce the highest level of coupling to achieve the desired increased in molecular weight.

The coupling increases the Mooney viscosity of the SIBR to be within the range of about 45 to about 100 or even 120. This high Mooney viscosity provides tires with tire tread compounds containing the isoprene terminated, coupled SIBR which may have good (reduced) rolling resistance and treadwear characteristics. To achieve these highly desirable objectives, it is beneficial for the Mooney viscosity of the isoprene terminated, coupled SIBR to be as high as reasonably possible However, the processibility of the rubber becomes more difficult as its Mooney viscosity increases. Accordingly, the Mooney viscosity of the rubber will typically not be in excess of about 100 or about 120. On the other hand, to get the low rolling resistance and outstanding tread wear, it is important for the Mooney viscosity of the SIBR to be at least 50 and preferably at least 70 and preferably higher. The isoprene terminated, coupled SIBR used in this invention will more typically have a Mooney viscosity which is within the range of about 80 to about 115 and will preferably have a Mooney viscosity which is within the range of 90 to 110.

After being coupled, the isoprene terminated, coupled SIBR produced is recovered from the organic solvent. The coupled SIBR can be recovered from the organic solvent by standard techniques, such as decantation, filtration, centrification and the like. It is often desirable to precipitate the coupled SIBR from the organic solvent by the addition of lower alcohols containing from 1 to about 4 carbon atoms to the polymer solution. Suitable lower alcohols for precipitation of the SIBR from the polymer cement include methanol, ethanol, isopropyl alcohol, n-propyl alcohol and t-butyl alcohol. The utilization of lower alcohols to precipitate the coupled SIBR from the polymer cement also "kills" the living SIBR chains by inactivating lithium end groups. After the coupled SIBR is recovered from the organic solvent, steam stripping can be employed to reduce the level of volatile organic compounds in the rubber.

The repeat units derived from styrene, isoprene and 1,3-butadiene are in the coupled SIBR in an essentially random order. However, the coupled SIBR is not truly random in that the polymer chains are virtually always terminated with isoprene repeat units. The term "random" as used herein means that the repeat units which are derived from styrene are well dispersed throughout the polymer and are mixed in with repeat units which are derived from isoprene and 1,3-butadiene. It has been determined that over 70% of the styrene in the SIBR is present in blocks of only one styrene repeat unit. Over 90% of the repeat units in the SIBR which are derived from styrene are in blocks of one or two repeat units. Over 95% of the styrene in the SIBR is present in blocks of three or less repeat units. Over 97% of the styrene present in the SIBR is present in blocks of four or less repeat units. Over 99% of the styrene present in the SIBR is present in blocks of five or less repeat units. Virtually 100% of the styrene present in the SIBR is in blocks of six or less repeat units. As has been previously indicated, virtually all of the SIBR polymer chains are terminated with isoprene repeat units, by this it is meant that over 98% of the SIBR chains are terminated with isoprene repeat units. Preferably, at least about 99 percent of the coupled SIBR polymer chains are terminated with isoprene repeat units.

Preferably, from about 10% to about 20% of the repeat units derived from the 1,3-butadiene are of the cis-microstructure. Preferably, from about 15% to about 30% of the repeat units derived from the 1,3-butadiene are of the trans-microstructure. Preferably, from about 55% to about 70% of the repeat units derived from the 1,3-butadiene are of the vinyl-microstructure. Preferably, from about 15% to about 30% of the repeat units derived from the isoprene are of the 1,4-microstructure. Preferably, from about 70% to about 85% of the repeat units derived from the isoprene are of the 3,4-microstructure.

After coupling, the isoprene terminated SIBR will preferably have a number average molecular weight which is within the range of about 250,000 to about 400,000. It is preferred for the coupled SIBR to have a weight average molecular weight which is within the range of about 500,000 to about 600,000. It is preferred for the coupled SIBR to have an inhomogeneity (u) which is within the range of about 0.8 to 1.2. Inhomogeneity is defined by the equation:

$$u = \frac{\text{weight average molecular weight}}{\text{number average molecular weight}} - 1$$

In other words, the ratio of the weight average molecular weight of the SIBR to its number average molecular weight is preferably 2:1.

For purposes of this patent specification, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

These isoprene terminated, coupled SIBR containing blends can be compounded utilizing conventional ingredients and standard techniques. For instance, the SIBR containing blends will typically be blended with carbon black and/or silica fillers, sulfur, accelerators, oils, waxes, scorch inhibiting agents and processing aids. In most cases, the SIBR containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. The filler can, of course, be comprised totally of silica. In some cases, at least some carbon black will be utilized in the filler. While it is considered that silica can be included in the filler to improve tear resistance and heat build-up, this invention is believed to be a departure from such general practice by requiring the rubber composition to be substantially reinforced with silica with only a minimal amount, if any, of carbon black. Clays and/or talc can be included in the filler to reduce cost.

The commonly employed siliceous pigments used in rubber compounding applications can be used as the silica in this invention, including pyrogenic and precipitated siliceous pigments (silica), although precipitated silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle sizes for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP silicas available from Degussa AG with, for example, designations VN2 and VN3, etc.

The blend will also normally include from about 1 to 5 phr of at least one accelerator with about 1.5 to about 4 phr being usually preferred. Antidegradants, such as antioxidants and antiozonants, will generally be included in the blend in amounts ranging from 0.25 to 10 phr with amounts in the range of 1 to 5 phr being usually preferred. Processing oils will generally be included in the blend in amounts ranging from 2 to 100 phr with amounts ranging from 5 to 50 phr being usually preferred. The isoprene terminated SIBR-containing blends of this invention will also normally contain from 0.5 to 10 phr of zinc oxide with 1 to 5 phr being usually preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The isoprene terminated, coupled SIBR containing rubber blends of this invention can be used in tire treads in conjunction with ordinary tire manufacturing techniques. Tires are built utilizing standard procedures. After the tire has been built with the SIBR containing blend, it can be vulcanized using a normal tire cure cycle. Tires made in accordance with this invention can be cured over a wide temperature range. However, it is generally preferred for the tires of this invention to be cured at a temperature ranging from about 132° C. (2700° F.) to about 170° C. (338° F.). It is more typical for the tires of this invention to be cured at a temperature ranging from about 145° C. (295° F.) to about 160° C. (320° F.). It is generally preferred for the cure cycle used to vulcanize the tires of this invention to have a duration of about 10 to about 25 minutes.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE I

In this Example, an isoprene terminated, silicon coupled, styrene/isoprene/butadiene rubber (SIBR) was prepared in a two-reactor (10 liters each) continuous system at about 95° C. A premix containing styrene, isoprene and 1,3-butadiene in hexane was charged into the first polymerization reactor continuously at a rate of about 65.6 grams/minute. The premix monomer solution contained a ratio of styrene to isoprene to 1,3-butadiene of about 10:30:60 and had a total monomer concentration of about 14%. Polymerization was initiated by adding a 0.128M solution of n-butyllithium into the first reactor at a rate of about 0.4 grams per minute. The resulting polymerization medium containing the live ends was continuously pushed into the second reactor where the coupling agent, silicon tetrachloride, (0.025M solution in hexane) was added at a rate of about 0.34 grams/minute. The residence time for both reactors was set at two hours to achieve complete monomer conversion in the first reactor and complete coupling in the second reactor. The polymerization medium was then continuously pushed over to a holding tank containing the shortstop (methanol) and an antioxidant. The resulting polymer cement was then steam stripped and the recovered SIBR was dried in a vacuum oven at about 60° C. The styrene distribution in the SIBR was random since the styrene, isoprene and butadiene monomers were continuously pumped into the reactors. The hexane solvent was evaporated and the resulting coupled SIBR terpolymer recovered by drying in a vacuum oven.

The coupled SIBR was determined by DSC measurement to have a glass transition temperature (Tg) of about −77° C. It was also determined to have a microstructure which contained about 11 percent polystyrene units, about 9 percent 1,2-polybutadiene units, about 53 percent 1,4-polybutadiene units, about 3 percent 3,4-polyisoprene units and about 24 percent 1,4-polyisoprene units. The Mooney viscosity (ML-4) of the coupled SIBR made was determined to be about 90.

EXAMPLE II

Blends of a silicon coupled styrene/isoprene/butadiene terpolymer elastomer (SIBR), prepared by the procedure described in Example I together with one or more of trans polybutadiene, natural (cis 1,4-PI) rubber, high vinyl polybutadiene (HVPBD) rubber, low Tg isoprene/polybutadiene rubber (LT-IBR), high Tg isoprene/butadiene rubber (HT-IBR), styrene/isoprene/butadiene rubber (SIBR) and 3,4-polyisoprene rubber (3,4-PI) were prepared and referenced herein as Examples B-G, respectively.

A control rubber composition composed of solution polymerization prepared styrene/butadiene rubber (S-SBR) and cis 1,4-polybutadiene rubber (cis-BR) also was prepared.

The following ingredients were included in the recipe: zinc oxide (2.5 phr), stearic acid (3 phr), aromatic rubber processing oil (23 phr), antidegradants, sulfur (1.4 phr) and vulcanization accelerators (3.7 phr).

The blended rubber compositions were individually cured for about 25 minutes at about 150° C.

The blend had been prepared by mixing in an internal mixer for about 7 minutes at a temperature of about 160° C. The recipes are shown in the following Table 1.

TABLE 1

|  | A | B | C | D | E | F | G |
|---|---|---|---|---|---|---|---|
| S-SBR[1] | 75 | | | | | | |
| Cis-BR[2] | 25 | | | | | | |
| Coupled SIBR[3] | | 70 | 70 | 60 | 70 | 65 | 75 |
| Trans-BR[4] | | 20 | | | | | |
| NR[5] | | 10 | | | | | 10 |
| HVPBD[6] | | | 30 | | | | |

TABLE 1-continued

|  | A | B | C | D | E | F | G |
|---|---|---|---|---|---|---|---|
| IBR[7] (50/50) |  |  |  | 40 |  |  |  |
| IBR[8] (30/70) |  |  |  |  | 30 |  |  |
| SIBR[9] |  |  |  |  |  | 35 |  |
| 3,4-PI[10] |  |  |  |  |  |  | 15 |

1. An organic solution polymerization prepared styrene/butadiene copolymer elastomer obtained as SLF 1216 from The Goodyear Tire & Rubber Company having a styrene content of about 11 percent and a Tg of about −42° C.
2. Cis 1,4-polybutadiene rubber obtained as BUDENE® 1207 from The Goodyear Tire & Rubber Company having a Tg of about −104° C.
3. An isoprene terminated, silicon coupled, styrene/isoprene/butadiene terpolymer elastomer prepared in accordance with Example I herein composed of styrene/isoprene/butadiene ratios of 10/30/60 and having a Tg of about −75° and a Mooney viscosity (ML−4) at 100° C. of 90.
4. A trans 1,4-polybutadiene containing about 80 percent trans 1,4-configuration and having a Tg of about −80° C.
5. Natural, cis 1,4-polyisoprene rubber.
6. A high vinyl polybutadiene rubber containing about 65 percent vinyl, 1,2-units and having a Tg of about −43° C.
7. A solution polymerization prepared isoprene/butadiene copolymer elastomer from The Goodyear Tire & Rubber Company, containing about 50 percent isoprene and having a Tg of about −45° C.
8. Isoprene/butadiene copolymer elastomer obtained from The Goodyear Tire & Rubber Company having an isoprene content of about 30 percent and a Tg of about −84° C.
9. Styrene/isoprene/butadiene terpolymer rubber with a 25/50/25 ratio of units derived from the monomers, respectively, with a Tg of about −30° C. obtained from The Goodyear Tire & Rubber Company.
10. A 3,4-polyisoprene rubber having a Tg of about −16° C. and a Mooney (ML(1+4) at 100° C. of about 80, obtained from The Goodyear Tire & Rubber Company.
11. A precipitated silica obtained as Zeosil 1165 MP from the Rhone-Poulenc company.
12. A blend of bis-3-(triethoxysilylpropyl) tetrasulfide and carbon black, in a 50/50 ratio as a silica coupler, and obtainable as X50S from Degussa A. G.

EXAMPLE III

The physical properties of the Examples A–G of Example II were evaluated and represented in the following Table 2.

The physical properties of composition Sample E, as compared to Samples A–D and G and F shown in Table 2 demonstrate that the coupled SIBR terpolymer rubber together with the low Tg isoprene/butadiene rubber provides superior performance by way of showing (i) higher rebound values, indicating a lower hysteresis rubber compound and predictive of a rubber tread composition promoting lower rolling resistance (ii) greater resistance to abrasion, predictive of improved treadwear, and (iii) higher hardness which would promote better tire handling (ie. cornering) and dry traction, particularly as compared to solution polymerization prepared styrene/butadiene rubber or a blend of such styrene/butadiene rubber and cis 1,4-polybutadiene rubber (Control Exp A).

In other words, a quantitatively silica reinforced rubber composition, with only a minimal of carbon black reinforcement, based on a blend of isoprene terminated, silicon coupled, isoprene terminated, SIBR and low Tg isoprene/butadiene rubber is observed to be beneficial to promote lower hysteresis, greater resistance to abrasion as well as higher hardness properties of a rubber composition. Other elastomers such as trans 1,4-polybutadiene, high vinyl polybutadiene (HVPBD), higher Tg isoprene/butadiene rubbers higher Tg SIBR and 3,4-polyisoprene rubber may be added as shown in Exps B, C, D, F and G to enhance, or improve, other tire performance parameters such as wet traction while still maintaining higher hardness and resistance to abrasion as compared to the Control, Exp A, of a rubber composition based upon a blend of cis 1,4-polybutadiene rubber and solution polymerization prepared styrene/butadiene rubber.

While certain representative embodiments and details have been shown for the purpose of illustrating the subject invention, it will be apparent to those skilled in this art that various changes and modifications can be made therein without departing from the scope of the subject invention.

What is claimed is:

1. A tire having a tread of a rubber composition which comprises, based upon 100 parts by weight of elastomers, (1) elastomers comprised of (A) about 40 to about 75 phr of a tin or silicon coupled, isoprene terminated, styrene/isoprene/butadiene (SIBR) terpolymer elastomer comprised of about 1 to about 20 weight percent units derived from styrene, about 12 to about 40 weight percent units derived from isoprene and about 40 to about 87 weight percent units derived from 1,3-butadiene in a relatively random distribution except for terminal isoprene units and having a Tg within a range of about −60° C. to about −85° C., (B) about 20 to about 50 phr of isoprene/butadiene copolymer elastomer having an isoprene content in a range of about 10 to about 30 percent and a Tg in a range of about −65° C. to about −95° C., and (C) about 5 to about 25 phr of at least one other elastomer consisting essentially of at least one of

TABLE 2

|  | A | B | C | D | E | F | G |
|---|---|---|---|---|---|---|---|
| $M_{100}$, MPa | 2.53 | 3.21 | 2.86 | 2.75 | 3.12 | 2.86 | 2.99 |
| $M_{300}$, MPa | 13.07 | 14.26 | 14.56 | 13.60 | 14.74 | 13.77 | 13.97 |
| $M_{300}/M_{100}$ | 5.17 | 4.44 | 5.09 | 4.95 | 4.72 | 4.81 | 4.67 |
| Tensile, MPa | 18.61 | 18.01 | 17.33 | 19.24 | 16.92 | 20.32 | 18.20 |
| Elongation at Break, % | 411 | 388 | 368 | 412 | 357 | 432 | 394 |
| Hardness, RT | 67.8 | 74.2 | 71.7 | 71.2 | 74.0 | 73.5 | 73.5 |
| Rebound, RT | 40.1 | 41.7 | 42.3 | 39.7 | 45.7 | 37.0 | 38.5 |
| DIN Abrasion, cc | 109 | 75 | 94 | 93 | 67 | 92 | 84 | isoprene/butadiene copolymer elastomer having a Tg in a range of about −50° C. to about −40° C., trans 1,4-polybutadiene polymer having a Tg in a range of about −65° C. to about −80° C., a styrene/isoprene/butadiene terpolymer rubber other than said isoprene terminated SIBR terpolymer, cis 1,4-polyisoprene rubber, cis 1,4-polybutadiene rubber, high vinyl polybutadiene rubber, styrene/isoprene copolymer rubber, styrene/butadiene copolymer rubber, and 3,4-polyisoprene rubber, (2) about 40 to about 115 phr of reinforcing filler comprised of (a) about 30 to about 90 phr of silica and (b) about 2 to about 25 phr of carbon black and (3) a silica coupler for said silica having a moiety reactive with the surface of the silica and another moiety interactive with said elastomers.

2. The tire of claim 1 wherein said tread is of a rubber composition which comprises, based upon 100 parts by weight of elastomers, (1) elastomers comprised of (A) about 50 to about 65 phr of said tin or silicon coupled copolymer of isoprene terminated styrene/isoprene/butadiene terpolymer elastomer, (B) about 25 to about 40 phr of isoprene/butadiene copolymer elastomer having a Tg in a range of about −65° C. to about −90° C., and (C) about 10 to about 20 phr of at least one elastomer selected from high vinyl polybutadiene rubber, 3,4-polyisoprene rubber, isoprene/butadiene rubber having a Tg in a range of about −50° C. to about −15° C., and a styrene/isoprene/butadiene terpolymer rubber having a Tg in a range of about −45° C. to about −20° C., (2) about 45 to about 90 phr of reinforcing filler comprised of (a) about 30 to about 65 phr of silica and (b) about 2 to about 60 phr of carbon black and (3) a silica coupler for said silica having a moiety reactive with the surface of the silica and another moiety interactive with said elastomers.

3. The tire of claim 1 where said isoprene terminated styrene/isoprene/butadiene (SIBR) terpolymer is tin coupled and has a Tg in a range of about −60° C. to about −85° C.

4. The tire of claim 1 wherein said isoprene terminated SIBR, in its unvulcanized state, has a Mooney viscosity of at least 70 and where the repeat units derived from styrene, isoprene and 1,3-butadiene are in substantially random order and where at least 90 percent of the units derived from styrene contain less than three repeat units.

5. The tire of claim 1 where said isoprene terminated styrene/isoprene/butadiene terpolymer is silicon coupled and has a Tg within a range of about −60° C. to about −85° C.

6. The tire of claim 5 wherein, for said tread composition, the said isoprene terminated, coupled SIBR is characterized by being comprised of repeat units which are derived from about 1 to about 10 weight percent styrene, about 15 to about 40 weight percent isoprene and from about 40 to about 87 weight percent 1,3-butadiene, wherein the repeat units derived from styrene, isoprene and 1,3-butadiene are in substantially random order and where at least 90 percent of the units derived from styrene contain less than three repeat units.

7. The tire of claim 6 wherein said SIBR in its unvulcanized state, has a Mooney viscosity of at least 70.

8. The tire of claim 1 wherein the rubber composition for the said tread is prepared by (a) thermomechanically working and mixing the elastomers, precipitated silica, carbon black if used, and silica coupler of claim 1 and conventional rubber compounding ingredients exclusive of sulfur and vulcanization accelerators with a mechanical mixer in at least one mixing stage to a maximum temperature in range of about 160° C. to about 190° C. and for a duration of time, upon reaching said maximum temperature range, of about 1 to about 8 minutes followed by (b) mixing sulfur and vulcanization accelerator(s) with said mixture with a mechanical mixer for about 1 to about 4 minutes to a temperature of about 90° C. to about 120° C., whereas the rubber mixture is cooled to a temperature below about 40° C. between each of the aforesaid mixing stages.

9. The tire of claim 4 wherein the rubber composition for the said tread is prepared by (a) thermomechanically working and mixing the elastomers, precipitated silica, carbon black if used, and silica coupler of claim 4 and conventional rubber compounding ingredients exclusive of sulfur and vulcanization accelerators with a mechanical mixer in at least one mixing stage to a maximum temperature in range of about 160° C. to about 190° C. and for a duration of time, upon reaching said maximum temperature range, of about 1 to about 8 minutes followed by (b) mixing including sulfur and vulcanization accelerator(s) with said mixture with a mechanical mixer for about 1 to about 4 minutes to a temperature of about 90° C. to about 120° C., whereas the rubber mixture is cooled to a temperature below about 40° C. between each of the aforesaid mixing stages.

10. The tire of claim 6 wherein the rubber composition for the said tread is prepared by (a) thermomechanically working and mixing the elastomers precipitated silica, carbon black if used, and silica coupler of claim 6 and conventional rubber compounding ingredients exclusive of sulfur and vulcanization accelerators with a mechanical mixer in at least one mixing stage to a maximum temperature in range of about 160° C. to about 90° C. and for a duration of time, upon reaching said maximum temperature range, of about 1 to about 8 minutes followed by (b) mixing including sulfur and vulcanization accelerator(s) with said mixture with a mechanical mixer for about 1 to about 4 minutes to a temperature of about 90° C. to about 120° C., whereas the rubber mixture is cooled to a temperature below about 40° C. between each of the aforesaid mixing stages.

* * * * *